United States Patent [19]

Nakamura et al.

[11] 4,111,533
[45] Sep. 5, 1978

[54] LIQUID CRYSTAL DISPLAY DEVICE

[75] Inventors: Kenji Nakamura, Kamakura; Iwao Seno, Toyonaka, both of Japan

[73] Assignee: L C Chemical Company Limited, Tokyo, Japan

[21] Appl. No.: 771,554

[22] Filed: Feb. 24, 1977

Related U.S. Application Data

[63] Continuation of Ser. No. 586,898, Jun. 16, 1975, abandoned.

[30] Foreign Application Priority Data

Nov. 15, 1974 [JP] Japan .............................. 49-138555[U]

[51] Int. Cl.² .............................................. G02F 1/13
[52] U.S. Cl. ...................................... 350/337; 350/334
[58] Field of Search ................ 350/154, 155, 160 LC; 354/295

[56] References Cited

U.S. PATENT DOCUMENTS

| | | | |
|---|---|---|---|
| 3,869,196 | 3/1975 | Kubota | 350/160 LC |
| 3,874,163 | 4/1975 | Ikeno | 350/160 LC X |
| 3,882,517 | 5/1975 | Land et al. | 354/295 |

*Primary Examiner*—Edward S. Bauer

[57] ABSTRACT

A twisted nematic liquid crystal display device employing a nematic liquid crystal material having positive dielectric anisotropy comprises a twisted nematic liquid crystal cell sandwiched between a pair of transparent substrates coated on the inside surface thereof with a conductive layer, and a pair of linear polarizers disposed adjacent the substrates. At least one of the linear polarizers can be changed in its orientation by 90° about the optical axis of the liquid crystal cell and is made demountable so as to be replaceable with another linear polarizer.

14 Claims, 5 Drawing Figures

LIQUID CRYSTAL DISPLAY DEVICE

This is a continuation of application Ser. No. 586,898 filed June 16, 1975, now abandoned.

BACKGROUND OF THE INVENTION

1. Field of the Invention

This invention relates to a liquid crystal display device, and more particularly to a twisted nematic liquid crystal display device employing a nematic liquid crystal material having positive dielectric anisotropy.

2. Description of the Prior Art

It has been known in the art to utilize a liquid crystal material for display purposes. Particularly, a twisted nematic liquid crystal cell has often been employed in liquid crystal display devices. A liquid crystal display device of this type is provided with a liquid crystal cell which comprises a pair of oppositely disposed transparent front and rear substrates bearing on the inside surface thereof a patterned conductive electrode layer, and a nematic-phase liquid crystal material of positive dielectric anisotropy filling the space therebetween. The inside surfaces of the transparent substrates are rubbed or provided with oblique incidence deposition of inorganic material at right angles to each other so as to effect a twisted nematic structure. Adjacent the front and rear substrates are provided crossed linear polarizers to constitute a liquid crystal display assembly which transmits light therethrough when no electric field is applied across the liquid crystal cell. The transmittivity of collimated light through the twisted nematic liquid crystal display assembly between crossed linear polarizers is decreased as a function of the electric field strength applied across the liquid crystal cell. In the absence of an electric field, an observer observing the device in the direction normal to the plane of the substrates and parallel to the normal optical axis will observe that the field of view is extinguished only if the direction of vibration (direction of linear polarization) of one linear polarizer is parallel to that of the other. It will be understood by those skilled in the art that the transmittivity of collimated light through the twisted nematic liquid crystal display device is increased as a function of the electric field strength applied across the liquid crystal cell when the polarizers disposed adjacent the transparent substrates are oriented in parallel to each other.

The space between the substrates, i.e. the thickness of the liquid crystal cell, is normally 1 to 50 microns. As the nematic-phase liquid crystal, a material of positive dielectric anisotropy such as p-n-hexyl benzylidene-p'-cyanoaniline, is employed.

In the conventional twisted nematic liquid crystal display device, a pair of crossed linear polarizers are generally fixed one to either surface of a liquid crystal cell including a pair of glass substrates by means of adhesive, tackifier or the like. It is, however, very difficult and requires a great deal of skill to fix the polarizers to the surface of the substrates without forming bubbles between the polarizers and the substrates. Further, the marginal portion of the polarizers are apt to peel off during the operation of fixing the polarizers to the surface of the substrates.

The polarizers are susceptible to scratching and become weak in high humidity and heat, and accordingly, the life thereof is short in comparison with the liquid crystal cell. Therefore, it is sometimes desired to replace the polarizers with new ones. Further, it is sometimes desired to rotate one linear polarizer by 90° with respect to the other linear polarizer about the optical axis of the liquid crystal cell to reverse the displayed pattern, from dark-on-light to light-on-dark image-background combination or vice versa. In addition, it is also sometimes desired to replace an achromatic linear polarizer with a colored linear polarizer to effect color display, i.e. to change dark-on-light (or light-on-dark) image-background combination to colored-on-light or dark-on-colored (or colored-on-dark or light-on-colored) combination.

In the conventional liquid crystal device as described above, however, the polarizers cannot be changed or rotated since they are fixed to the substrates by adhesives or the like.

SUMMARY OF THE INVENTION

In view of the above described observations and description of the conventional twisted nematic liquid crystal device, it is the primary object of the present invention to provide a liquid crystal device employing a twisted nematic liquid crystal cell in which at least one of the linear polarizers provided adjacent the transparent substrates is changeable.

It is another object of the present invention to provide a liquid crystal device employing a twisted nematic liquid crystal cell in which at least one of the linear polarizers provided adjacent the transparent substrates is rotatable by 90° about the optical axis of the liquid crystal cell.

The foregoing objects and other objects are accomplished in accordance with this invention by providing a demountable linear polarizer cassette which is demountably fixed to at least one side of a liquid crystal cell. The liquid crystal display device is provided with at least one cassette holding casing adjacent at least one of the transparent substrates of the liquid crystal cell for receiving the polarizer cassette. The cassette is formed in square shape and slid into the cassette holding casing. In accordance with a preferred embodiment of the invention, the polarizer is supported in a frame of the cassette which comprises a pair of support plates sandwitching the polarizer therebetween. The pair of support plates are provided with an opening to expose the central part of the polarizer and securely sandwitch the polarizer therebetween for protecting the polarizer and maintaining its flatness. The cassette not only facilitates the mounting of the polarizer to the liquid crystal cell but also makes the polarizer changeable. Further, the cassette makes it possible to rotate the polarizer by 90° about the optical axis of the liquid crystal cell.

PREFERRED EMBODIMENTS OF THE INVENTION

Figure 1:
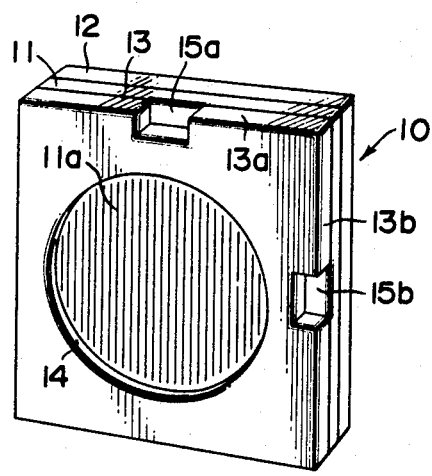
FIG. 1 is a perspective view of an example of a polarizer cassette employed in a liquid crystal device in accordance with an embodiment of the present invention.
Figure 2:
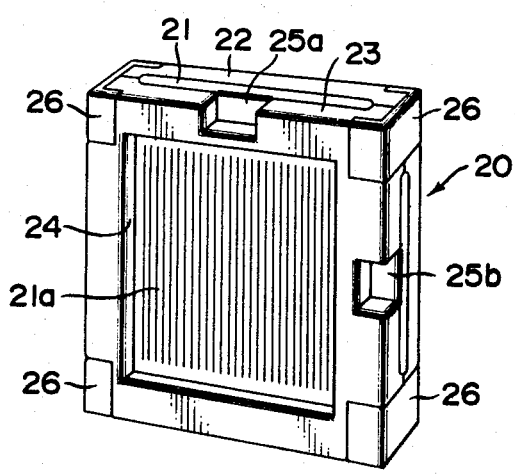
FIG. 2 is a perspective view of another example of the polarizer cassette employed in this invention.

One example of a polarizer cassette to be demountably fixed to a liquid crystal cell employed in a liquid crystal cell in accordance with an embodiment of the present invention is illustrated in FIG. 1. Referring to FIG. 1, a linear polarizer 11 is sandwiched between a pair of oppositely disposed support plates 12 and 13 to form a polarizer cassette 10. The support plates 12 and 13 have a flat inner surface to hold the linear polarizer 11 flat. Both support plates 12 and 13 are provided with a circular opening 14 to expose the central part 11a of the polarizer 11. The shape of the opening 14 is not limited to circular as shown in FIG. 1, but may be, e.g. square as shown in FIG. 2. (The example shown in FIG. 2 will hereinafter be described in detail.) When the shape of the display can be selected freely, the shape of the opening 14 should preferably be circular or oval so as to keep the polarizer as flat as possible. Further, the support plates 12 and 13 need not have the opening 14 if they are made of transparent material. The support plates 12 and 13 are formed of a plates of a stiff but easy-to-process material, e.g., a metal such as stainless steel or aluminium or plastics such as polyester or acrylic acid resin.

In the embodiment shown in FIG. 1, the pair of support plates 12 and 13 are fixed to the linear polarizer 11 by means of adhesives. The support plates 12 and 13 are square shaped so that two orientations of the cassette 10 differing by 90° can be selected in inserting the cassette in a cassette holding casing to reverse the pattern from dark-on-light to light-on-dark image-background combination. (The cassette holding casing will hereinafter described in detail.) The upper side edge 13a and the right side edge 13b of one support plate 13 are provided with cut-away portions to form finger grips 15a and 15b so that the cassette 10 may easily be taken out of the cassette holding casing.

Another example of the polarizer cassette to be demountably fixed to the liquid crystal cell is shown in FIG. 2. Referring to FIG. 2, a linear polarizer 21 is sandwiched between a pair of oppositely disposed support plates 22 and 23 having a flat inner surface to hold the polarizer 21 in flat condition to form a polarizer cassette 20. The support plates 22 and 23 are provided with a square opening 24 to expose the central part 21a of the polarizer 21. In this embodiment, the support plates 22 and 23 are not fixed to the polarizer 21 by adhesives, but stacked together with the polarizer 21 sandwiched therebetween by grips 26 mounted at the four corners of the support plates 22 and 23 as shown in FIG. 2. In this embodiment also, the support plates 22 and 23 are square shaped to form a square-shaped polarizer cassette 20 to facilitate insertion of the polarizer 21 in a cassette holding casing which will hereinafter described in either of two orientations which differ by 90°. Similarly to the embodiment shown in FIG. 1, the support frame 23 is provided with cut-away portions 25a and 25b on the side edges thereof as shown in FIG. 2.

Figure 3:
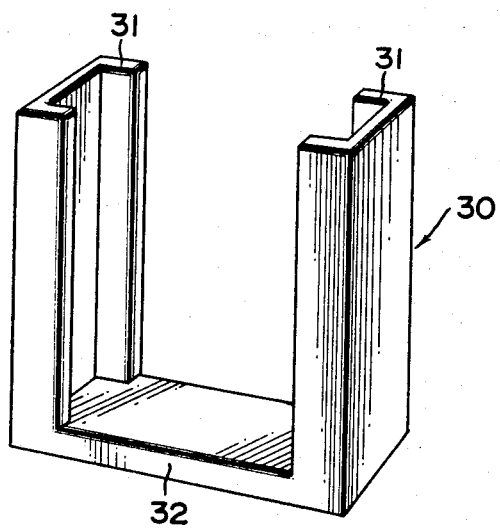
FIG. 3 is a perspective view of an example of a cassette holding casing employed in a liquid crystal display device in accordance with a preferred embodiment of the present invention.
Figure 4:
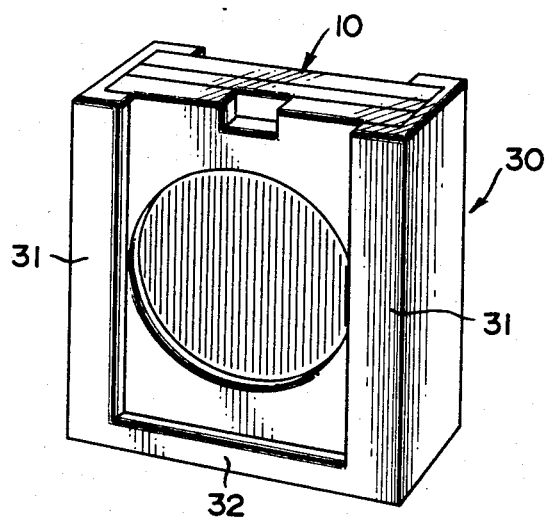
FIG. 4 is a perspective view showing a cassette of a polarizer as shown in FIG. 1 mounted in a cassette holding casing as shown in FIG. 3.

FIG. 3 shows one example of a cassette holding casing 30 having oppositely disposed guide rails 31, 31 integrally fixed to a bottom plate 32. The space between the oppositely disposed guide rails 31, 31 is designed to be equal to the width of the cassette. Said polarizer cassette 10 or 20 is slid into the cassette holding casing 30 between the oppositely disposed guide rails 31, 31 until the cassette comes to the end of the rails abutting on the bottom plate 32 as shown in FIG. 4, which illustrates said polarizer cassette 10 shown in FIG. 1 held in the cassette holding casing 10.

Although the cassette holding casing 30 has vertically extending guide rails 31, 31 and the upper end thereof is open, it will be understood by those skilled in the art that the cassette holding casing may be made open at the right or left side thereof with the rails thereof extending horizontally. It is only required that the cassette holding casing be capable of holding the cassette firmly in a predetermined position and of allowing the cassette to be changed or allowing the orientation of the cassette to be rotated by 90° to reverse the image-background combination. Further, it is an important function of the cassette holding casing to allow the cassette to be brought into the predetermined position without damaging the polarizer supported thereby.

The cassette holding casing 30 is also formed of a stiff but easy-to-process material such as metal or plastics similarly to the polarizer support plates 12, 13 and 22, 23.

The liquid crystal display device in accordance with the present invention comprises a twisted nematic liquid crystal cell sandwitched between a pair of oppositely disposed transparent substrates and a pair of linear polarizers oppositely disposed adjacent the transparent substrates, wherein at least one of the pair of linear polarizers is supported in a polarizer cassette and demountably fixed to the liquid crystal cell. When only one linear polarizer is supported in a cassette, the other polarizer may be adhered to the liquid crystal cell. In one variation of the invention, a liquid crystal cell may be sandwitched between a pair of polarizer cassettes and stacked together therewith.

The polarizer cassette can be replaced with another carrying a different type of polarizer or the orientation thereof can be rotated by 90° to effect reversal of the image-background combination of the image displayed thereby.

In order to constitute a liquid crystal display device, the liquid crystal cell and the polarizer cassette or cassettes are combined with electrodes, driving circuit means, a cover and so forth. Generally, the electrodes are provided on the inner surface of the transparent substrates sandwitching the liquid crystal cell. The electrodes are made in the form of a display pattern.

In order to obtain as sharp an image as possible by the display device, the linear polarizers are desired to be located as close to the liquid crystal cell as possible.

In a preferred embodiment of this invention, the polarizer cassette holding casing is formed integral with a holder for holding a liquid crystal cell so that the linear polarizers may be accurately positioned in parallel to the liquid crystal cell.

Figure 5:
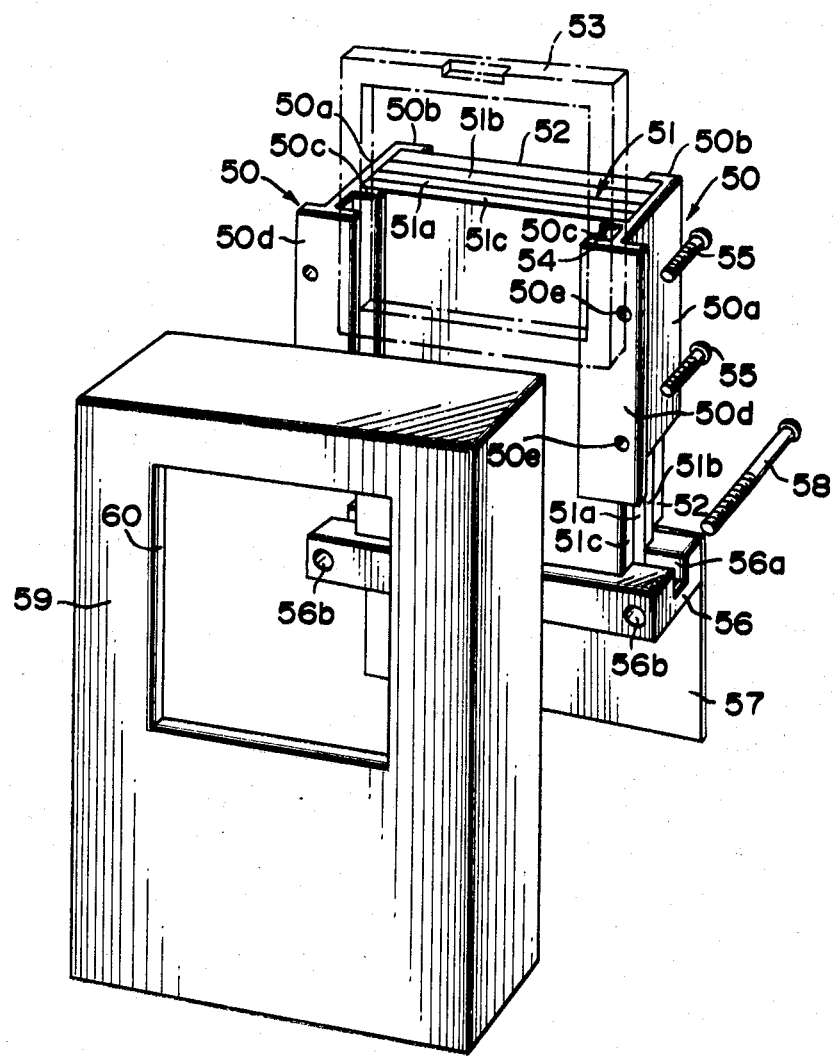
FIG. 5 is an exploded perspective view showing a liquid crystal display device in accordance with a preferred embodiment of the present invention.

One embodiment of such a type of display device is shown in FIG. 5. Referring to FIG. 5, a liquid crystal cell 51 comprised of a twisted nematic liquid crystal material 51a interposed between a pair of oppositely disposed transparent substrates 51b and 51c is stacked together with a linear polarizer 52 by means of a pair of oppositely disposed grip holders 50 to hold opposite side edges of the cell 51 and the polarizer 52. Each grip holder 50 comprises a flat rectangular portion 50a vertically extending along the side edge of the cell 51 and the polarizer 52 orthogonally to the front and rear surfaces thereof, the front end thereof being forwardly extended beyond the front surface of the liquid crystal cell 51, a first grip portion 50b vertically extending along the rear end of the flat rectangular portion 50a orthogonal thereto to hold the rear face of the polarizer 52, a second grip portion 50c vertically extending on the inner face of the flat rectangular portion 50a orthogonal thereto to hold the front face of the liquid crystal cell 51, the space between the first and second grip portions 50b and 50c being substantially equal to the total thickness of the liquid crystal cell 51 and the polarizer 52 attached to the rear face thereof, and a third grip portion 50d vertically extending along the front end of the flat rectangular portion 50d orthogonal thereto to form a guide rail 54 for a polarizer cassette 53 (indicated in broken lines) together with said second grip portion 50c along the inner face of the forwardly extending front end part of the flat rectangular portion 50a, the space between the second and third grip portions 50c and 50d being substantially equal to the thickness of the polarizer cassette 53. The third grip portions 50d is extended outwardly beyond the flat rectangular portion 50a. The outwardly extended part of the third grip portion 50d is provided with holes 55e for fixing screws 55.

The liquid crystal cell 51 and the linear polarizer 52 are further supported at the bottom end thereof by a bottom holder 56 extending laterally along the bottom end of the cell 51 and the polarizer 52. The bottom holder 56 is provided with a groove 56a to receive a downwardly extending portion of the substrate 51b of the liquid crystal cell 51 bearing a part of the electrode thereof. The groove 56a is, therefore, in electrical contact with the electrode and serves as a connector to electrically connect the electrode to a printed circuit on a printed circuit board 57 attached to the bottom holder 56. The bottom holder 56 is also provided with holes 56b for fixing screws 58.

The grip holders 50, 50 and the bottom holder 56 are fixed to a cover frame 59 having a display aperture 60 by means of said fixing screws 55 and 58.

In assembling the display device, the liquid crystal cell 51 and the linear polarizer 52 are supported in a stacked state by said pair of grip holders 50, 50 and bottom holder 56, and after a polarizer cassette 53 like the one as shown in FIGS. 1 or 2 is inserted between said guide rails 54, the grip holders 50, 50 and the bottom holder 56 are fixed to the cover frame 59.

As will be understood from the above description, the polarizer cassette 53 can be exchanged for another. For instance, a polarizer cassette 53 carrying an old polarizer can be charged to one carrying a new linear polarizer, or a cassette carrying an achromatic linear polarizer to one carrying a colored linear polarizer.

Further, it will be understood by those skilled in the art that in the above described embodiment shown in FIG. 5 the polarizer 52 stacked together with the liquid crystal cell 51 can also be made in the form of a cassette so that both polarizers can be changed. Further, it should be noted that the display device may be modified so that the front polarizer can be stacked together with the liquid crystal cell 51 and the rear polarizer 52 can be made changeable.

We claim:

1. A liquid crystal display device comprising in combination:
a twisted nematic liquid crystal cell including a pair of transparent substrates carrying on the inner surface thereof electrode means and a liquid crystal material having positive dielectric anisotropy sandwiched between said substrates,
a connector means including an electric circuit electrically connected with said electrode means for applying an electric field across said liquid crystal cell,
a pair of linear polarizers disposed adjacent said transparent substrates to sandwich said liquid crystal cell therebetween,
at least one of said pair of linear polarizers being supported in a cassette, said cassette comprising a pair of rigid support plates having flat inner surfaces with said linear polarizer mounted therebetween and supported by said plates, said support plates including an opening to expose the central part of the polarizer, and
a cassette holding means separate from said cassette for demountably fixing said cassette to said liquid crystal cell, said cassette and said one polarizer displaying an outer peripheral shape which cooperates with said cassette holding means such that said cassette is positionable in two alternate fixed positions, 90° from one another in a common plane, relative to said cell, without moving said holding means relative to said cell.

2. A liquid crystal display device as defined in claim 1 wherein the shape of said opening is circular.

3. A liquid crystal display device as defined in claim 1 wherein the shape of said opening is square.

4. A liquid crystal display device as defined in claim 1 wherein said rigid support plates are made of transparent material.

5. A liquid crystal display device as defined in claim 1 wherein said pair of rigid support plates are adhered one to either surface of the polarizer.

6. A liquid crystal display device as defined in claim 1 wherein said pair of support plates are held by means of a plurality of grip means which mechanically grips the support plates from both sides thereof to force the support plates against the polarizer interposed therebetween.

7. A liquid crystal display device as defined in claim 1 wherein said cassette is square shaped.

8. A liquid crystal display device as defined in claim 1 wherein said support plates are such that only said central part of said polarizer is exposed.

9. A liquid crystal display device comprising in combination:
a twisted nematic liquid crystal cell including a pair of transparent substrates carrying on the inner surface thereof electrode means and a liquid crystal material sandwiched between said substrates,
a connector means including an electric circuit electrically connected with said electrode means for applying an electric field across said liquid crystal cell,
a pair of linear polarizers disposed adjacent said transparent substrates to sandwich said liquid crystal cell therebetween,
one of said linear polarizers being disposed in contact with said liquid crystal cell,
the other of said linear polarizers being supported in a cassette, said cassette comprising a pair of rigid support plates having flat inner surfaces engaging said linear polarizer to hold said polarizer therebetween and to support said plate, said support plates including an opening to expose the central part of the polarizer and
a cassette holding casing means provided adjacent one of said transparent substrates of the liquid crystal cell for holding said cassette parallel to the liquid crystal cell, said cassette being demountably held in said cassette holding casing means and displaying an outer peripheral shape which cooperates with said holding means such that said cassette is positionable in two alternate fixed positions, 90° from one another in a common plane, relative to said cell, without moving said holding means relative to said cell.

10. A liquid crystal display as defined in claim 9 wherein said cassette holding casing means comprises a pair of oppositely disposed guide rails and an end plate fixed to an end of said rails.

11. A liquid crystal display device as defined in claim 9 wherein said cassette holding casing means if formed integral with a liquid crystal cell holding means which supports said liquid crystal cell.

12. A liquid crystal display device as defined in claim 11 wherein said liquid crystal cell holding means comprises a pair of oppositely disposed grip holders which hold opposite sides of the liquid crystal cell together with said one linear polarizer disposed in contact with the liquid crystal cell, said grip holders being provided with a pair of oppositely disposed guide rails serving as said cassette holding casing means, and a bottom holder which supports the bottom of said liquid crystal cell and linear polarizers.

13. A liquid crystal display device as defined in claim 9 wherein said support plates are such that only said central part of said polarizer is exposed.

14. A liquid crystal display device as defined in claim 9 wherein said outer peripheral shape is square.

* * * * *